United States Patent [19]

Yajima et al.

[11] 4,267,211

[45] May 12, 1981

[54] PROCESS FOR PRODUCING CORROSION-, HEAT- AND OXIDATION-RESISTANT SHAPED ARTICLE

[75] Inventors: Seishi Yajima; Kiyohito Okamura; Toetsu Shishido; Yoshio Hasegawa, all of Oharai, Japan

[73] Assignee: The Foundation: The Research Institute for Special Inorganic Materials, Kashima, Japan

[21] Appl. No.: 92,405

[22] Filed: Nov. 8, 1979

[30] Foreign Application Priority Data

Nov. 13, 1978 [JP] Japan .................................. 53-138937
Dec. 22, 1978 [JP] Japan .................................. 53-157506
Dec. 23, 1978 [JP] Japan .................................. 53-158158

[51] Int. Cl.$^3$ ............................................... B05D 3/02
[52] U.S. Cl. .................................... 427/228; 264/29.5; 264/29.6; 427/384; 427/386; 427/387; 427/388.1; 427/393.6; 427/422; 427/435; 427/443.2

[58] Field of Search ............. 427/228, 387, 386, 388.1, 427/384, 393.6, 435, 422, 419.7, 443.2; 106/287.13, 287.14, 287.15, 287.16, 44; 264/29.5, 29.6

[56] References Cited

U.S. PATENT DOCUMENTS

| 3,385,723 | 5/1968 | Pickar | 427/228 |
| 3,628,985 | 12/1971 | Hider et al. | 427/228 |
| 4,110,386 | 8/1978 | Yajima et al. | 264/29.5 |
| 4,117,057 | 9/1978 | Yajima et al. | 264/63 |
| 4,117,096 | 9/1978 | Hosaka et al. | 423/345 |
| 4,122,139 | 10/1978 | Yajima et al. | 264/44 |

Primary Examiner—Ronald H. Smith
Assistant Examiner—Thurman K. Page
Attorney, Agent, or Firm—Ladas & Parry

[57] ABSTRACT

A process for producing a corrosion-, heat- and oxidation-resistant shaped article which comprises coating a shaped article composed of at least one material selected from metals, carbonaceous substances and ceramics with a coating composition comprising a semi-inorganic compound, and heat-treating the coated article, said semi-inorganic compound being at least one polymer selected from the group consisting of polycarbosilanes and polycarbosiloxanes.

5 Claims, No Drawings

PROCESS FOR PRODUCING CORROSION-, HEAT- AND OXIDATION-RESISTANT SHAPED ARTICLE

BACKGROUND OF THE INVENTION

This invention relates to a process for producing a shaped article having superior resistance to corrosion, heat and oxidation.

The present inventors previously developed a method for producing a corrosion-, heat- and oxidation-resistant material, which comprises coating the surface of a ceramic powder with a semi-inorganic compound such as a polycarbosilane or polycarbosiloxane, molding the coated powder into the desired shape by a suitable molding method such as mold pressing or extrusion, and heat-treating the molded article. They disclosed this method in U.S. Pat. No. 4,117,057, U.S. Pat. No. 4,110,386, U.S. Pat. No. 4,122,139, and U.S. Pat. Application Ser. No. 5,882 filed Jan. 23, 1979.

The present invention provides a simpler and more economical process for producing a corrosion-, heat- and oxidation-resistant shaped article than the prior art mentioned above. The process of this invention comprises coating not a powder but a shaped article with a semi-inorganic compound, and then heat-treating the coated article. Thus, the step of molding a powder which is essential to the prior art method can be omitted.

SUMMARY OF THE INVENTION

The present invention provides in a process for producing a corrosion-, heat- and oxidation-resistant shaped article which comprises coating a shaped article composed of at least one material selected from metals, carbonaceous substances and ceramics with a coating composition comprising a semi-inorganic compound, and heat-treating the coated article, said semi-inorganic compound being at least one polymer selected from the group consisting of (1) polycarbosilanes of the following formula

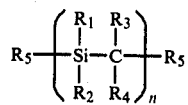

wherein $R_1$, $R_2$, $R_3$, $R_4$ and $R_5$, independently from each other, represent a hydrogen atom, an alkyl group having not more than 4 carbon atoms, a haloalkyl group having not more than 4 carbon atoms, a phenyl group, a cycloalkyl group having 5 to 8 carbon atoms, a benzyl group or a vinyl group, and n is from 5 to 200, and (2) polycarbosiloxanes of the formula

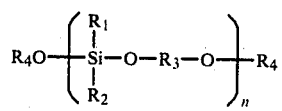

wherein $R_1$, $R_2$ and $R_4$, independently from each other, represent an alkyl group having not more than 4 carbon atoms, a haloalkyl group having not more than 4 carbon atoms, a phenyl group, a cycloalkyl group having 5 to 8 carbon atoms, a benzyl group or a vinyl group; $R_3$ represents a linear alkylene group of the formula $-(CH_2)_n-$ in which n is an integer of 1 to 6, a propylene group

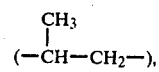

or a glycerol group

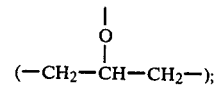

and n is from 2 to 200.

The shaped article produced by the process of this invention has superior corrosion resistance particularly to phosphor bronze, pig iron, converter slag, blast furnace slag, metals (alkali metals, alkaline earth metals, transition metals, type metals, semi-metals, rare earth metals, actinium metals), alloys of these metals, melts of the aforesaid materials, and molten metal salts.

In a preferred embodiment of this invention, the coating composition contains at least one of powdery metals, carbonaceous substances or ceramics in addition to the semi-inorganic compound.

DETAILED DESCRIPTION OF THE INVENTION

The semi-inorganic compound used to coat a shaped article in the process of this invention is the polycarbosilane (1) and/or the polycarbosiloxane (2). The polycarbosilane (1) and the polycarbosiloxane (2) are known polymers.

The method of producing the polycarbosilane (1) is disclosed, for example, in Fritz, Angew, Chem. 79, p. 657 (1967) or U.S. Pat. Nos. 4,052,430 and 4,134,759 assigned to the same inventors as those of the present application. It can also be produced by the method disclosed in U.S. Patent Application Ser. No. 953,518 filed on Oct. 23, 1978 by the same applications as in the present application. On the other hand, the polycarbosiloxane (2) can be produced by the method disclosed, for example, in U.S. Patent Application Ser. No. 930,079 filed on Aug. 1, 1978 by the same applicants as in the present application.

Preferred species of the polycarbosilane (1) are those of the formula

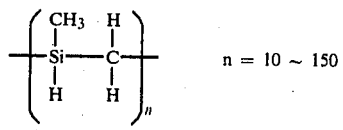

and preferred species of the polycarbosiloxane (2) are those of the formula

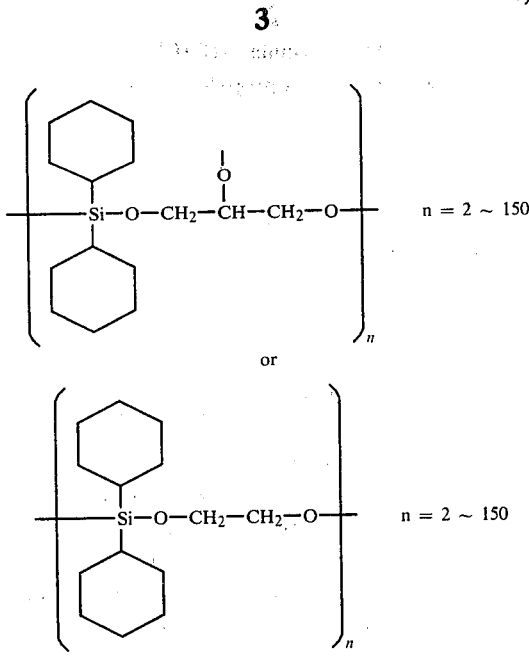

The polycarbosilane (1) and the polycarbosiloxane (2) may sometimes be referred to inclusively as "semi-inorganic compounds specified in this invention". The semi-inorganic compound specified in this invention is converted to a ceramic consisting mainly of SiC (amorphous, $\beta$-type, or $\alpha$-type, or a mixed phase of these) when heated to a temperature in the range of 400° to 2,000° C. in a non-oxidizing atmosphere. The ratio of the residue left on firing at this time is as high as 40 85%. The semi-inorganic compound specified in this invention has good solubility in solvents, and can easily be formed into a solution of a high concentration. Moreover, since the solution has sufficient flowability despite its high concentration, the operation of coating this solution on the surface of a shaped article can be performed easily with good efficiency. The adhesion between the coated solution and the shaped article is good, and therefore, the coating obtained after heat-treatment adheres firmly to the shaped article and has good resistance to cracking or delamination. The coating obtained after the heat treatment is a coated layer of ceramics resulting from the conversion of the semi-inorganic compound. The coating has good resistance to corrosion, heat and oxidation, and functions as a protective coating for the shaped article. Since the ceramic coating layer adheres firmly to the shaped article, it can be used also as a binder for bonding coated articles to each other.

The process of this invention is characterized by the fact that at least the outside surface (i.e., only the outside surface, or both the outside and inside surfaces) of a shaped article is coated with a coating composition containing the semi-inorganic compound, and the resulting coated article is heat-treated to impart superior corrosion, heat and oxidation resistances to the shaped article.

The shaped article is composed of at least one of metals, carbonaceous substances and ceramics. The metals include alkaline earth metals, transition metals, type metals, methalloids, rare earth metals, actinium metals, and alloys of these metals. Typical examples of the metals are mild steel, special alloy steels, stainless steel, chromium, manganese, zinc, cobalt, nickel, copper, silver, aluminum, titanium, zirconium, molybdenum, tungsten, beryllium, yttrium, niobium, tantalum, Ti-Al alloy, Cu-Al alloy, Cu-Ni alloy, superhard alloys, and cermets. Typical examples of the carbonaceous substances are carbon and graphite. The ceramics include oxides, carbides, silicides, nitrides, borides, boron, and glass. Typical examples of the ceramics are $SiO_2$, $Al_2O_3$, BeO, $ZrO_2$, BN, $Si_3N_4$, $B_4C$, SiC, B/W, SiC/W, silicate glass, aluminosilicate glass, borate glass, borosilicate glass and phosphosilicate glass.

The shaped article may have any desired configuration such as a plate, rod, fiber, tube, coil or complex profile. The process of this invention is applicable to shaped articles usually sold on the market, such as crucibles, bricks fibers and hollow cylindrical articles made of $Al_2O_3$, MgO, SiC, Fe, Al or F-13Cr alloy. It is also applicable to a shaped article obtained by sintering a commercially available inorganic molding powder (e.g., $Al_2O_3$, MgO, SiC, Fe, Al or Fe-13Cr alloy) using the semi-inorganic compound specified in this invention or known binders as a bonding agent, and to a shaped article obtained by heating the semi-inorganic compound specified in this invention at 400° to 2,000° C. in a non-oxidizing atmosphere, and sintering the resulting ceramic powder alone or together with a known binder.

The semi-inorganic compound specified in this invention is generally obtained as a powder or viscous liquid. To make the powder or viscous liquid coatable on a shaped article, it is preferred to dissolve or dilute it in or with a solvent therefor, such as tetrahydrofuran, benzene, toluene, xylene, hexane, diethyl ether, dioxane, chloroform, methylene chloride, petroleum ether, petroleum benzine, ligroin, furon, dimethyl sulfoxide, and dimethyl formamide, and use it as a coating solution. If the viscous liquid as obtained is coatable, it can be directly used. Alternatively, a melt obtained by heating the semi-inorganic compound may be used for coating.

Various customary methods can be used to coat the shaped article. For example, the following methods can be used.

(1) The surface of the shaped article is coated with the coating solution, viscous liquid or melt by such an operation as brush coating or spraying. If desired, the coating liquid may be sprayed onto the surface of the heated article to perform coating and heat-treatment simultaneously.

(2) The shaped article is dipped in the coating solution, viscous liquid or melt, and then withdrawn. This dipping method is especially preferred when the shaped article is porous and it is desired to impregnate the coating liquid sufficiently into the inside of the shaped article. If desired, to achieve sufficient impregnation, the shaped article may be deaerated in vacuum prior to dipping.

The temperature at which the heat-treatment is carried out varies depending upon the material of the shaped article. Generally, temperatures in the range of 400° to 2,000° C. can be used. Usually, it is preferable to perform the heating in a non-oxidizing atmosphere (e.g., an inert gas such as argon or nitrogen, CO gas, $CO_2$ gas, or vacuum).

If desired, the coating step and the heat-treatment step may be performed two or more times.

When the shaped article is a nonporous article, for example a plate or rod-like material of a metal or alloy, carbon fibers or a ceramic crucible such as an alumina crucible, the coating and heat-treatment gives a corrosion-, heat- and oxidation-resistant protective coating firmly adhering to the outer exposed surface of the shaped article. When the shaped article is composed of a metal or alloy, it is preferred to sand-blast the surface of the metal or alloy surface or chemically treat it (for example, treatment with a phosphoric acid or sodium hydroxide) because it improves the adhesion of the coating. Sometimes, the adhesion of the coating can be improved by using a coating solution of the semi-inorganic compound containing a small amount of phosphoric acid, sodium hydroxide or potassium hydroxide.

On the other hand, when the shaped article is a porous article such as a graphite crucible for melting high-melting metals, or a susceptor made of porous ceramics, the coating and heat-treatment can afford a corrosion-, heat- and oxidation-resistant protective coating which adheres firmly not only to the outside surface but also to the inside surface of the shaped article.

A preferred embodiment of this invention is a process which comprises preparing a coating composition from the semi-inorganic compound specified in this invention and at least one of powdery metals, carbonaceous substances and ceramics, coating a shaped article composed of at least one of metals, carbonaceous substances and ceramics with the resulting coating composition, and then heat-treating the coated article.

The aforesaid coating composition is suitable for use in forming a protective coating having good corrosion, heat and oxidation resistances on the surface of the shaped article composed of at least one of metals, carbonaceous substances and ceramics, or in bonding two similar or dissimilar shaped articles selected from metals, carbonaceous substances and ceramics.

The coating composition used in the embodiment of this invention contains the semi-inorganic compound specified in this invention (a first component), and at least one of powdery metals, carbonaceous substances and ceramics (a second component). The preferred particle diameter of the second component (powder) is usually 0.1 to 10 microns. The ratio between the first component and the second component in the composition is such that the proportion of the first component is usually 10 to 95% by weight based on the total weight of the first and second components.

When the semi-inorganic compound used as the first component is obtained as a liquid, the coating composition can be prepared by mixing the first and second components. Usually, however, the coating composition preferably contains a solvent. Usable solvents are those exemplified hereinabove. If desired, the coating composition may further contain various additives such as vehicles, plasticizers, desiccants, pigments, pigment dispersants, curing agents, ultraviolet absorbers, antioxidants, antisagging agents, levelling agents, antifoamers, and crosslinking agents for borosiloxane compounds.

The shaped article used in the embodiment of this invention is composed of at least one of metals, carbonaceous substances and ceramics. The metals are preferably metals or alloys having a melting point of at least 500° C. The ceramics are preferably oxides, carbides, silicides, nitrides, borides, boron, cement, gypsum, mica, and asbestos. When the aforesaid coating composition is used to bond shaped article, combinations of metal-metal, metal-ceramics, ceramics-ceramics, ceramics-carbon, carbon-metal, and carbon-carbon may be used as materials to be bonded. When using ceramics or carbon materials, the coating composition in accordance with this invention is especially effective for builing irregularly-shaped bricks.

The method for forming a protective coating on the shaped article by using the aforesaid coating composition can be performed in the same way as described above. The method for bonding shaped articles to each other is basically the same as the method of forming a protective coating. Specifically, the surfaces to be coated of the shaped articles are coated with the coating composition of this invention, and then the assembly is heated. When the heating is carried out under pressure, a stronger bonding can be achieved. Application of pressure may be effected by simply placing a weight on the shaped articles to be bonded. It is recommended in this case to heat only that part of the assembly which is required to be heated. Use of a hot press is also effective because it results in simultaneous heating and pressing.

If desired, the formation of a protective coating and bonding may be effected simultaneously. In other words, it is possible to bond two shaped articles to each other and to form a protective coating on the surface of the bonded article. Both in the formation of a protective coating and in bonding, it is preferable to carry out the heat-treatment usually in a non-oxidizing atmosphere at a temperature of 400° to 2,000° C.

The shaped article having a protective coating in the preferred embodiment of this invention is characterized by the fact that it is generally stable in use at 400° C. and higher in the air. A heat-resistant insulation coating can be obtained when a ceramic powder such as $Al_2O_3$ or $SiO_2$ is used as a second component, and the baking temperature is limited to the one at which the semi-inorganic compound is not completely converted to an inorganic compound (usually 500° C.). On the other hand, when a powder of a metal such as aluminum and brass is used as the second component and the baking is performed at a temperature up to a point at which the semi-inorganic compound is completely converted to an inorganic compound, a heat-resistant, electrically conductive coating is obtained. When a protective coating is formed by using a coating composition composed mainly of a combination of a ceramic powder and the semi-inorganic compound, the coating obtained after heat-treatment is chemically stable, and shows high corrosion resistance against acids, alkalies, $SO_2$ and other corrosive gases, exhaust waste gases, reducing gases, molten metals, and molten slags. The protective coating adheres strongly to the shaped article, and no delamination is noted under ordinary rapid cooling conditions.

The bonded article obtained by bonding two substrates to each other is generally stable in use at more than 400° C. in the art. The bond strength is usually at least 700 kg/cm$^2$, and does not decrease even at 500° C. The electric conductivity and chemical stability of the bonded interface are the same as in the case of the protective coating, and the bonded interface is stable under quenching conditions.

The corrosion-, and heat- and oxidation-resistant shaped article prepared in accordance with the present invention can be used in a wide range of applications. For example, they are useful as architectural and building materials, materials for transportation facilities such as air planes, ships and boats, and motor vehicles, anticorrosive materials for industrial plants, electrical materials, mechanical materials, nuclear power materials, and sporting goods, etc. The shaped article obtained by the process of this invention may be used as a reinforcing material and combined with a matrix such as metals, carbonaceous materials, ceramics or plastics to form a composite material.

The following Examples illustrate the present invention more specifically.

EXAMPLE 1

A 5-liter three-necked flask was charged with 2.5 liters of anhydrous xylene and 383 g of sodium, and under a stream of argon gas, 1 liter of dimethyldichlorosilane was added dropwise. After the addition, the mixture was heated under reflux for 8 hours in a stream of argon gas to form a precipitate. The precipitate was filtered, and washed first with methanol and then with water to afford a polysilane as a white powder. The polysilane was charged into an autoclave, and reacted at 450° C. for 20 hours. After the reaction, the reaction product was dissoled in n-hexane, and taken out of the autoclave. The solution was filtered, and concentrated by heating it to 100° C. by using a vacuum pump to obtain a solid semi-inorganic compound (polycarbosilane).

The polycarbosilane was melted and coated on each of the commercially available ceramic crucibles for metal melting shown in Table 1, and then heated to 1300° C. in nitrogen to obtain coated shaped articles (crucibles) of this invention.

Converter slag and blast furnace slag were each put into each of the resulting coated crucibles and the starting uncoated crucibles, and heated to 1600° C. The time that elapsed until the molten material oozed out onto the outer surface of the crucible was measured. The results are shown in Table 1.

TABLE 1

|  | MgO crucible | | $Al_2O_3$(SSA.S) crucible | | SiC crucible | |
| --- | --- | --- | --- | --- | --- | --- |
|  | Un-treated | Coated and heated twice. | Un-treated | Coated and heated twice. | Un-treated | Coated and heated twice. |
| Converter slag | 1.5 days | 5 days | 20 sec. | 3 min. | 0.5 day | 4 days |
| Blast furnace slag | 3 days | 5 days | 30 sec. | 3 min. | 1 day | 4 days |

The same coating effect was noed on other ceramics such as crucibles of $Al_2O_3$-$SiO_2$ and $Si_3N_4$. In particular, with regard to phosphor bronze, pig iron, converter slag, blast furnace slag, molten metals and molten metal carbonates, the service lives of the crucibles were seen to increase to 2 to 5 times those of the untreated crucibles.

EXAMPLE 2

Dichlorodiphenylsilane (253 g) and 62 g of ethylene glycol were dissolved in 500 ml of n-butyl ether, and the solution was heated under reflux at 90° to 100° C. for 24 hours. After the reaction, the solvent and the unreacted materials were removed by distillation at 200° C. and 20 mmHg. The resulting semi-inorganic compound (polycarbosiloxane) was melted and coated on a commercially available SiC plate (purity 99%, density 2.8 g/cm³), and then heated to 1700° C. (coated and heated twice) in nitrogen to form a coated shaped article in accordance with this invention.

The resulting coated SiC plate and the uncoated starting SiC plate were each dipped for 20 minutes in each of molten pig iron and phosphor bronze at 1300° C., and then pickled with dilute nitric acid. The weight of the plate which was lost by corrosion was measured. In the case of molten pig iron, the weight loss by corrosion of the coated SiC plate was ¼ of that of the untreated SiC plate. In the case of molten phosphor bronze, the weight loss by corrosion of the coated SiC plate was ⅗ of that of the starting SiC plate.

The same coating effect was noted on other ceramic plates ($Al_2O_3$, $Al_2O_3$-$SiO_2$, MgO, $Si_3N_4$, etc.). In particular, the weight loss by corrosion of the treated plate was less than 166 of that of the untreated plate in phosphor bronze, pig iron, converter slag, blast furnace slag, molten metals, and molten metal carbonates.

EXAMPLE 3

The same semi-inorganic compound as used in Example 2 was melted and coated on graphite bricks (electrode plate), and heated to 800° C. in a stream of argon gas. Again, the same polymer was coated on the resulting coating and heated to 1700° C.

When the coated bricks were heated at 500° C. for 1 hour in the air, the weight loss of the bricks by oxidation was 1/10 of that of the uncoated graphite bricks.

EXAMPLE 4

Glycerol (102 g) and 365 g of dichlorodiphenylsilane were dissolved in 500 ml of n-butyl ether, and the solution was heated under reflux at 90° to 100° C. for 18 hours. The resulting product was dissolved in benzene to remove the unreacted glycerol. Then, the solvent was distilled off to afford a semi-inorganic compound. The resulting semi-inorganic compound (polycarbosiloxane) was molten and coated on a commercially available SiC plate (purity 99%, density 2.8 g/cm³), and heated to 1700° C. in nitrogen (coated and heated twice) to afford a coated shaped article of this invention. The coated shaped article was dipped for 200 hours in molten pig iron and phosphor bronze at 1300° C., and pickled with dilute nitric acid. Then, the weight loss of the plate by corrosion was measured. In the case of the molten pig iron, the weight loss by corrosion of the coated shaped article was 1/5 of that of the untreated shaped article. In the case of the molten phosphor bronze, the weight loss by corrosion of the coated shaped article was ¼ of that of the untreated shaped article.

The same coating effect was noted on other ceramics plates ($Al_2O_3$, $Al_2O_3$-$SiO_2$, MgO, $Si_3N_4$, etc.). In particular, the weight loss by corrosion of the coated plate was less than ¼ of that of the untreated plate in phosphor bronze, pig iron, converter slag, blast furnace slag, molten metals, and molten metal carbonates.

EXAMPLE 5

Glycerol (102 g) and 365 g of dichlorodiphenylsilane were dissolved in 500 ml of n-butyl ether, and the solution was heated under reflux at 90° to 100° C. for 24 hours. After the reaction, the solvent and the unreacted materials were removed by distillation at 200° C. and 20 mmHg. The resulting semi-inorganic compound (polycarbosiloxane) was dissolved in benzene to a concentration of 7% by weight. The resulting solution was coated on a bundle of carbon fibers (8,000 fibers), and heated to 700° C. in an atmosphere of nitrogen. The carbon fiber bundle was mixed in an amount of 10% by volume with magnesium oxide powder having a particle diameter of 1 μm, and the mixture was sintered in argon at 1200° C. The resulting composite material had an impact strength of $20\times10^4$ erg/cm$^2$. Magnesium oxide alone showed an impact strength of $1\times10^4$ erg/cm$^2$.

EXAMPLE 6

One part by weight of the same semi-inorganic compound (polycarbosiloxane) as used in Example 5, 6 parts by weight of metallic aluminum powder having a particle diameter of 2 microns and 1 part by weight of γ-alumina having a particle diameter of 0.5 micron were mixed, and 1 part by weight of an epoxy resin and 1 part by weight of n-butanol were added and mixed to form a solution. The resulting paint was coated on a sandblasted mild steel plate, and baked at 500° C. in a stream of nitrogen. The coating had especially good adhesion to the mild steel plate, and when the product was dipped in water after being heated to 600° C., peeling of the coated film and a change in its surface were not observed.

EXAMPLE 7

The same paint as used in Example 6 was used as an adhesive, and coated on one surface of each of an Si$_3$N$_4$ article and an SiC article. They were bonded to each other at the adhesive-coated surfaces and heated to 1700° C. in nitrogen. The bondage obtained showed a tensile strength of 4.1 kg/mm$^2$. The bonded interface was chemically stable, and showed strong resistance to SO$_2$ and other corrosive gases and molten metals.

A 5-liter three-necked flask was charged with 2.5 liters of anhydrous xylene and 400 g of sodium, and they were heated to the boiling point of xylene in a stream of nitrogen gas. One liter of dimethyldichlorosilane was added dropwise over the course of 1 hour. After the addition, the mixture was heated under reflux for 10 hours to form a precipitate. The precipitate was collected by filtration, and washed with methanol and then with water to afford 420 g of polydimethylsilane as a white powder.

Separately, 759 g of diphenyldichlorosilane and 124 g of boric acid were heated to 100° to 120° C. in n-butyl ether to afford a white resinous product. The product was heated in vacuum at 400° C. for 1 hour to afford 530 g of polyborodiphenylsiloxane.

Then, 8.27 g of polyborodiphenylsiloxane was mixed with 250 g of polydimethylsilane, and the mixture was heated to 370° C. in a 2-liter quartz tube fitted with a reflux tube, and polymerized for 6 hours to afford polycarbosilane partly containing siloxane bonds. The reaction product was allowed to cool to room temperature, and benzene was added. The solution was taken out, filtered, and benzene was evaporated to afford 140 g of solid polycarbosilane.

The resulting semi-inorganic compound (polycarbosilane) was melted and coated on a commercially available SiC plate (purity 99%, density 2.8 g/cm$^3$), and then heated to 1500° C. in an atmosphere of nitrogen (coated and heated twice) to obtain a coated shaped article of this invention.

The treated SiC plate and the starting SiC plate were each dipped for 20 hours in each of molten pig iron and phosphor bronze at 1300° C., and then pickled with dilute nitric acid. Then, the weight loss by corrosion of each of the plates was measured. In the case of the molten pig iron, the weight loss by corrosion of the coated SiC plate was 1/5 of that of the untreated SiC plate. In the case of the molten phosphor bronze, the weight loss by corrosion of the treated SiC plate was ¼ of that of the untreated SiC plate.

What we claim is:

1. A process for producing a corrosion-, heat- and oxidation-resistant shaped article which comprises coating a shaped article composed of at least one material selected from metals, carbonaceous substances and ceramics with a coating composition comprising a semi-inorganic compound, and heat-treating the coated article at 400° to 2,000° C. in a non-oxidizing atmosphere, said semi-inorganic compound being at least one polymer selected from the group consisting of (1) polycarbosilanes of the following formula

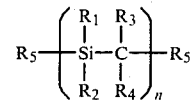

wherein R$_1$, R$_2$, R$_3$, R$_4$ and R$_5$, independently from each other, represent a hydrogen atom, an alkyl group having not more than 4 carbon atoms, a haloalkyl group having not more than 4 carbon atoms, a phenyl group, a cycloalkyl group having 5 to 8 carbon atoms, a benzyl group or a vinyl group, and n is from 5 to 200, and (2) polycarbosiloxanes of the formula

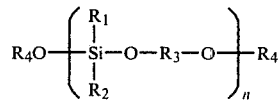

wherein R$_1$, R$_2$ and R$_4$, independently from each other, represent an alkyl group having not more than 4 carbon atoms, a haloalkyl group having not more than 4 carbon atoms, a phenyl group, a cycloalkyl group having 5 to 8 carbon atoms, a benzyl group or a vinyl group; R$_3$ represents a linear alkylene group of the formula —(CH$_2$)$_n$— in which n is an integer of 1 to 6, a propylene group

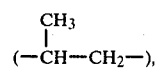

or a glycerol group

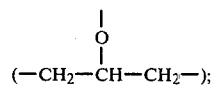

and n is from 2 to 200.

2. The process of claim 1 wherein said shaped article is a non-porous shaped article composed of at least one material selected from metals, carbonaceous substances and ceramics.

3. The process of claim 1 wherein said shaped article is a porous shaped article composed of at least one material selected from carbonaceous substances and ceramics.

4. The process of claim 1 wherein said coating composition consists of said semi-inorganic compound and at least one of powdery metals, carbonaceous substances or ceramics.

5. The process of claim 1 which further includes a step of combining the heat-treated shaped article with at least one matrix selected from the group consisting of metals, carbonaceous substances, ceramics and plastics to form a composite.

* * * * *